(12) United States Patent
Zeng

(10) Patent No.: US 7,991,550 B2
(45) Date of Patent: Aug. 2, 2011

(54) METHOD AND APPARATUS FOR ON-VEHICLE CALIBRATION AND ORIENTATION OF OBJECT-TRACKING SYSTEMS

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

(21) Appl. No.: 12/123,332

(22) Filed: May 19, 2008

(65) Prior Publication Data

US 2008/0300787 A1 Dec. 4, 2008

Related U.S. Application Data

(63) Continuation-in-part of application No. 11/347,009, filed on Feb. 3, 2006, now abandoned.

(51) Int. Cl.
G08G 1/16 (2006.01)
G06F 17/10 (2006.01)
G06G 7/78 (2006.01)

(52) U.S. Cl. .......... 701/301; 701/117; 701/300; 342/59; 340/435

(58) Field of Classification Search .................. 701/301, 701/117, 201; 342/59, 70, 95, 174, 195, 342/450–451; 340/435–436, 703
See application file for complete search history.

(56) References Cited

U.S. PATENT DOCUMENTS

| | | | |
|---|---|---|---|
| 4,227,212 A * | 10/1980 | Woolfson et al. | 348/170 |
| 4,713,768 A * | 12/1987 | Kosaka et al. | 701/300 |
| 4,782,450 A | 11/1988 | Flax | |
| 5,090,803 A | 2/1992 | Ames et al. | |
| 5,341,142 A * | 8/1994 | Reis et al. | 342/64 |
| 5,923,284 A | 7/1999 | Artis et al. | |
| 5,983,161 A * | 11/1999 | Lemelson et al. | 701/301 |
| 6,028,548 A | 2/2000 | Farmer | |
| 6,285,959 B1 | 9/2001 | Greer | |
| 6,359,586 B1 * | 3/2002 | Sviestins | 342/451 |
| 6,459,395 B1 * | 10/2002 | Kida et al. | 341/126 |
| 6,476,914 B1 | 11/2002 | Hoelzl et al. | |
| 6,515,615 B2 | 2/2003 | Burchett | |
| 6,556,168 B1 | 4/2003 | Marumoto et al. | |
| 6,922,632 B2 * | 7/2005 | Foxlin | 701/207 |
| 6,972,710 B2 | 12/2005 | Matsubara et al. | |
| 7,720,577 B2 * | 5/2010 | Cheng et al. | 701/2 |
| 7,889,118 B1 * | 2/2011 | Finley et al. | 342/118 |

(Continued)

FOREIGN PATENT DOCUMENTS

AU 2003264048 A1 * 2/2004

(Continued)

OTHER PUBLICATIONS

Multiwavelength simultaneous monitoring circuit employing wavelength crossover properties of arrayed-waveguide grating Teshima, M.; Koga, M.; Sato, K.; Electronics Letters; vol. 31 , Issue: 18; Digital Object Identifier: 10.1049/el:19951062 Publication Year: 1995 , pp. 1595-1597.*

(Continued)

Primary Examiner — Cuong H Nguyen

(57) ABSTRACT

A method for simultaneously tracking a plurality of objects and registering a plurality of object-locating sensors mounted on a vehicle relative to the vehicle is based upon collected sensor data, historical sensor registration data, historical object trajectories, and a weighted algorithm based upon geometric proximity to the vehicle and sensor data variance.

34 Claims, 5 Drawing Sheets

U.S. PATENT DOCUMENTS

| | | | |
|---|---|---|---|
| 2003/0002713 | A1 | 1/2003 | Chen |
| 2003/0090411 | A1 | 5/2003 | Haney et al. |
| 2003/0193430 | A1 | 10/2003 | Gresham et al. |
| 2004/0073360 | A1* | 4/2004 | Foxlin ................... 701/207 |
| 2007/0073473 | A1 | 3/2007 | Altan et al. |
| 2007/0271032 | A1* | 11/2007 | Cheng et al. ............ 701/207 |

FOREIGN PATENT DOCUMENTS

| | | | |
|---|---|---|---|
| DE | 102008012375 | A1 * | 9/2008 |
| EP | 1577682 | A1 * | 9/2005 |
| EP | 2196972 | A1 * | 6/2010 |
| KR | 2005034871 | A * | 4/2005 |
| WO | WO 2004015369 | A2 * | 2/2004 |
| WO | WO 2010068106 | A1 * | 6/2010 |

OTHER PUBLICATIONS

Performance of multiwavelength simultaneous monitoring circuit employing arrayed-waveguide grating; Teshima, M.; Koga, M.; Ken-Ichi Sato; Lightwave Technology, Journal of ; vol. 14 , Issue: 10; Digital Object Identifier: 10.1109/50.541219 Publication Year: 1996 , pp. 2277-2285.*

Analytical estimation of measurement error performance of multiwavelength simultaneous monitoring circuit; Teshima, M.; Koga, M.; Electronics Letters; vol. 33 , Issue: 19; Digital Object Identifier: 10.1049/el:19971091; Publication Year: 1997 , pp. 1645-1647.*

Fabrication of multiwavelength simultaneous monitoring device using arrayed-waveguide grating; Okamoto, K.; Hattori, K.; Ohmori, Y.; Electronics Letters; vol. 32 , Issue: 6; Digital Object Identifier: 10.1049/el:19960379; Publication Year: 1996 , pp. 569-570.*

Streaming-Viability Analysis and Packet Scheduling for Video Over In-Vehicle Wireless Networks; Qiong Li; Andreopoulos, Y.; van der Schaar, M.; Vehicular Technology, IEEE Transactions on; vol. 56 , Issue: 6 , Part: 1; Digital Object Identifier: 10.1109/TVT.2007.901927; Publication Year: 2007 , pp. 3533-3549.*

Model-Driven Traffic Data Acquisition in Vehicular Sensor Networks; Chih-Chieh Hung; Wen-Chih Peng; Parallel Processing (ICPP), 2010 39th International Conference on; Digital Object Identifier: 10.1109/ICPP.2010.50; Publication Year: 2010 , pp. 424-432.*

High accuracy traffic monitoring using road-side line-scan cameras; Douxchamps, D.; Macq, B.; Chihara, K.; Intelligent Transportation Systems Conference, 2006. ITSC '06. IEEE; Digital Object Identifier: 10.1109/ITSC.2006.1706854 Publication Year: 2006 , pp. 875-878.*

Toward next generation of driver assistance systems: A multimodal sensor-based platform; Rezaei, M.; Sarshar, M.; Sanaatiyan, M.M.; Computer and Automation Engineering (ICCAE), 2010 The 2nd International Conference on vol. 4; Digital Object Identifier: 10.1109/ICCAE.2010.5451782; Publication Year: 2010 , pp. 62-67.*

Congestion Pricing That Preserves Driver Privacy ; Blumberg, A.J.; Chase, R.; Intelligent Transportation Systems Conference, 2006. ITSC '06. IEEE; Digital Object Identifier: 10.1109/ITSC.2006.1706828; Publication Year: 2006 , pp. 725-732.*

Application of Self-Tuning to Automotive Cruise Control; Tsujii, M.; Takeuchi, H.; Oda, K.; Ohba, M.; American Control Conference, 1990; Publication Year: 1990 , pp. 1843-1848.*

Catadioptric vision system for an optimal observation of the driver face and the road scene; Layerle, J.-F.; Savatier, X.; Mouaddib, E.-M.; Ertaud, J.-Y.; Intelligent Vehicles Symposium, 2008 IEEE; Digital Object Identifier: 10.1109/IVS.2008.4621269 Publication Year: 2008 , pp. 410-415.*

Driver assistance: an integration of vehicle monitoring and control; Petersson, L.; Apostoloff, N.; Zelinsky, A.; Robotics and Automation, 2003. Proceedings. ICRA '03. IEEE International Conference on; vol. 2; Digital Object Identifier: 10.1109/ROBOT.2003.1241903; Publication Year: 2003 , pp. 2097-2103 vol. 2.*

* cited by examiner

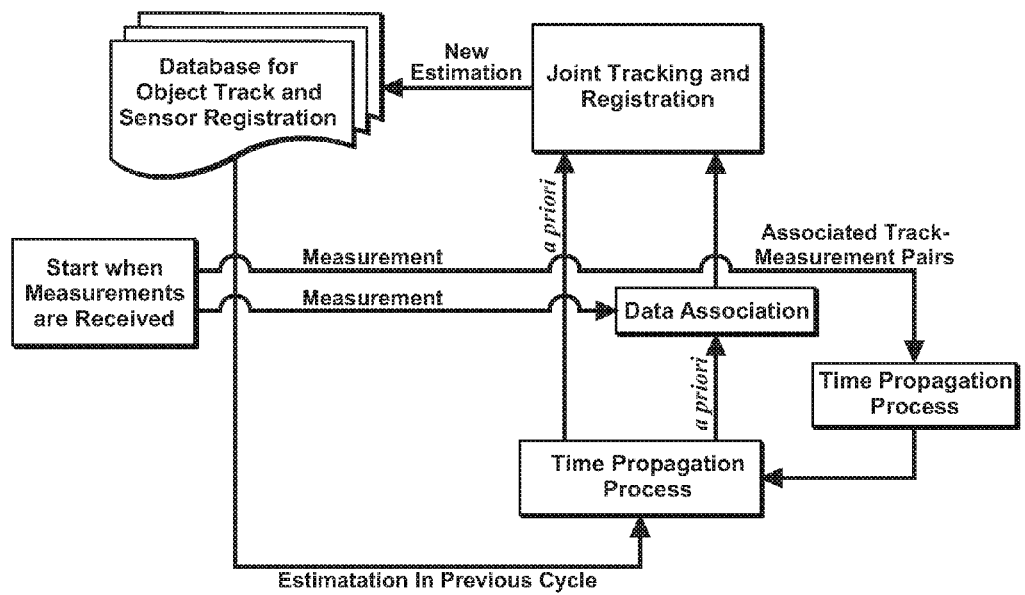
FIG. 6
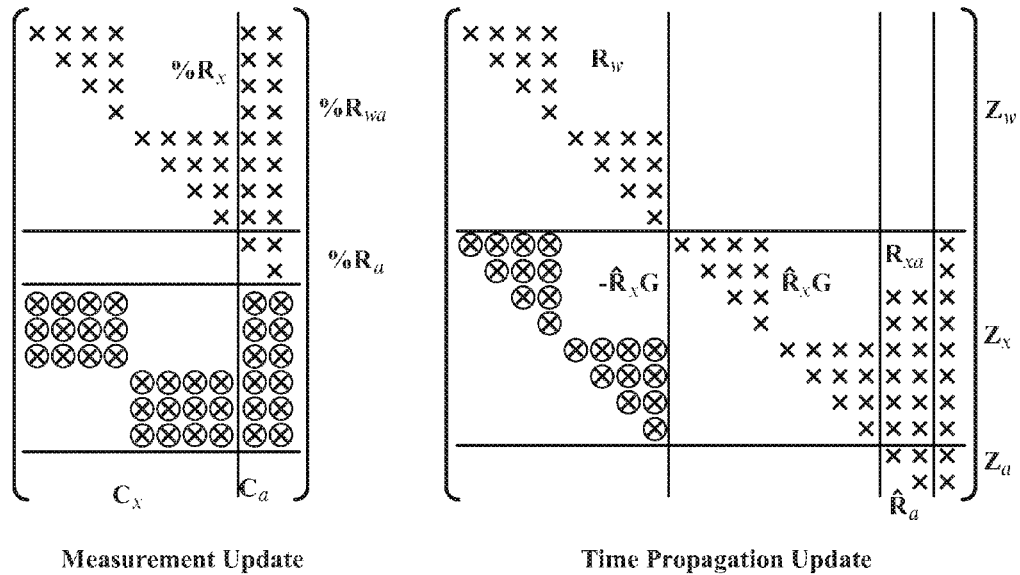
Measurement Update
Time Propagation Update
FIG. 7
FIG. 8

Add Lane Constraint Equations In Tracking and Registration

METHOD AND APPARATUS FOR ON-VEHICLE CALIBRATION AND ORIENTATION OF OBJECT-TRACKING SYSTEMS

CROSS REFERENCE TO RELATED APPLICATIONS

This application is a continuation of U.S. application Ser. No. 11/347,009, filed Feb. 3, 2006, which is hereby incorporated herein by reference in its entirety.

Applicant incorporates by reference co-pending U.S. patent application Ser. No. 11/235,679, entitled SYSTEM AND METHOD OF TARGET TRACKING USING SENSOR FUSION, in that the method and apparatus for fusing tracking data from a plurality of sensors to more accurately estimate a location of an object not be fully described in detail herein.

TECHNICAL FIELD

This disclosure pertains generally to object-tracking systems, and more specifically to measurement systems associated with object-tracking systems related to vehicle operation.

BACKGROUND

The statements in this section merely provide background information related to the present disclosure and may not constitute prior art.

Modern vehicles may be equipped with various sensing devices and systems that assist a vehicle operator in managing vehicle operation. One type of sensing system is intended to identify relative locations and trajectories of other vehicles and other objects on a highway. Exemplary systems employing sensors, such as radar and camera systems, which identify relative locations and trajectories of other vehicles and other objects on the highway include collision-avoidance systems and adaptive cruise control systems.

Sensor systems installed on vehicles are typically calibrated during the vehicle assembly process. However, sensor orientation and signal output may drift during the life of the sensor, such that the orientation of the sensor relative to the vehicle is changed. When the sensor orientation drifts, measurements become skewed relative to the vehicle. When there are multiple sensors, this concern is further complicated.

In order for the data from various sensors to be combined to produce a consistent object map, i.e. locus and trajectory of a remote object, the sensor data need to be correctly registered. That is, the relative locations of the sensors, and the relationship between their coordinate systems and the vehicle coordinate system, typically oriented to the vehicle frame, need to be determined. When a system fails to correctly account for registration errors, a result may include a mismatch between a compiled object map (sensor data) and ground truth. Examples include an overstated confidence in location and movement of a remote object (or target) such as a vehicle, and unnecessary multiplicity of tracks in an on-board tracking database, including multiple tracks corresponding to a single remote object.

Therefore, there is a need to align each individual sensor with an accuracy comparable to its intrinsic resolution, e.g., having an alignment accuracy of 0.1 degree for a sensor having an azimuth accuracy on an order of 0.1 degree. Precision sensor mounting is vulnerable to drift during the vehicle's life and difficult to maintain manually.

There is a need to ensure that signals output from sensors are aligned and oriented with a fixed coordinate system to eliminate risk of errors associated with skewed readings. Therefore, it is desirable to have a sensor system that automatically aligns sensor output to the vehicle reference coordinate system. It is also desirable to align the sensors using a tracked object as a reference and lane information on which target vehicles and the host vehicle travel, in order to facilitate regular, ongoing alignments, to improve sensor accuracy and reduce errors associated with drift.

Known approaches for object tracking and sensor registration have determined each separately. These approaches have been computationally intensive and therefore ineffective for larger numbers of targets. Sensor bias errors have been treated as parameters derived by minimizing the discrepancy between measurements and associated fused target estimated from a separated tracking module. This approach is ineffective in cases where the position of a tracked object is different from that of ground truth. Consequently, adjusting alignment parameters to minimize the discrepancy from the position of the tracked object is not sufficient to correct the misalignments of the radar and camera.

Another limitation with separate object tracking and sensor registration includes assuming the correlation between track and registration parameters are zero. This assumption is rarely true. For example, alignment parameters usually are more sensitive to far away targets. Therefore, attaching lesser weight to far away targets with high uncertainties and greater weight in target estimations with low uncertainties would result in more accurate tracking and registration.

SUMMARY

A method for simultaneously tracking a plurality of objects and registering a plurality of object-locating sensors mounted on a vehicle relative to the vehicle includes monitoring sensor data from the plurality of object-locating sensors, monitoring a plurality of historical target tracks for the plurality of objects, and monitoring historical sensor registration data. Tracking of the plurality of objects and registering the plurality of object-locating sensors is carried out simultaneously based upon the sensor data, the historical sensor registration data, the plurality of historical target tracks, location and orientation of the sensors to the vehicle and a sensor data covariance matrix. The plurality of historical target tracks for each of the plurality of objects is updated based upon the tracking of the plurality of objects. And, the historical sensor registration data are updated based upon the registering of the plurality of object-locating sensors.

BRIEF DESCRIPTION OF THE DRAWINGS

One or more embodiments will now be described, by way of example, with reference to the accompanying drawings, in which:

FIGS. 4-10 are schematic diagrams of a control system, in accordance with a second embodiment of the disclosure.

DETAILED DESCRIPTION

Figure 1:
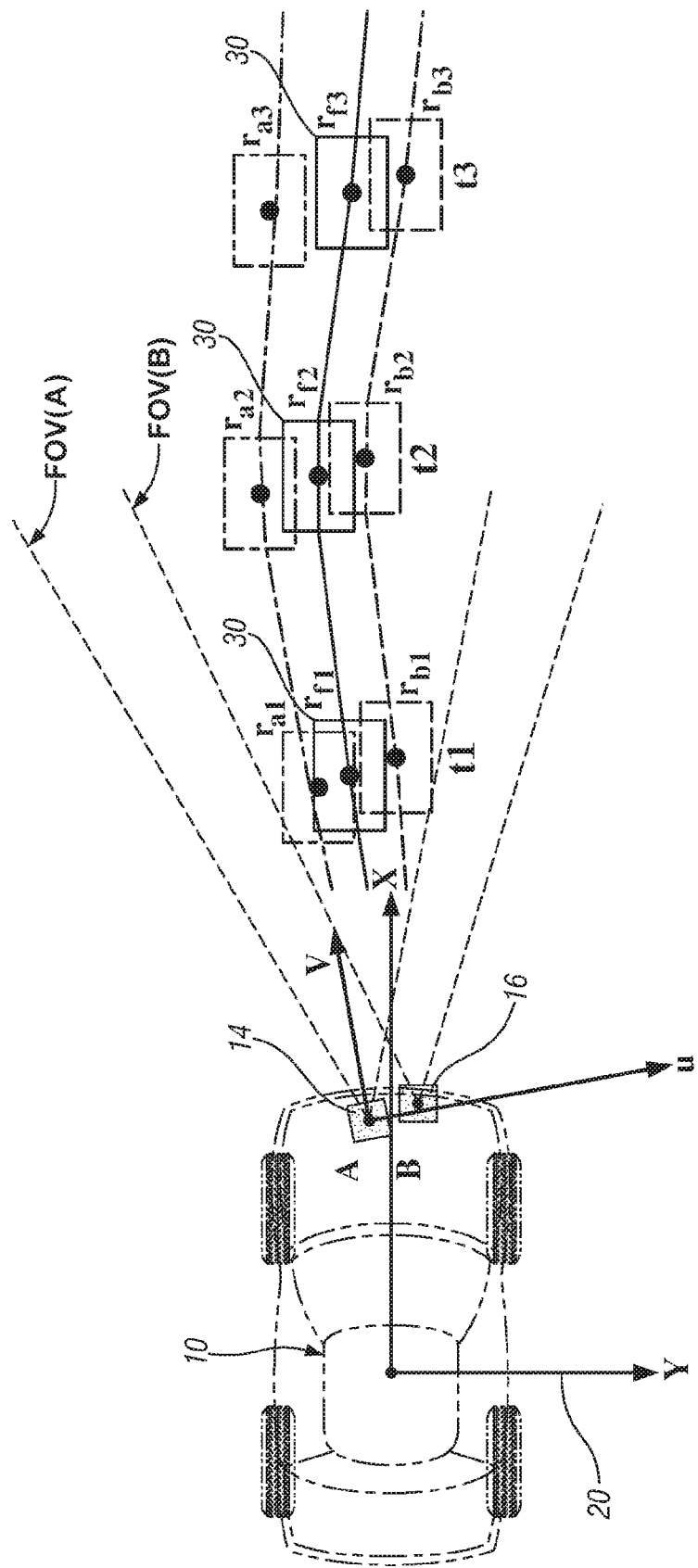
FIG. 1 is a schematic diagram of a vehicle system, in accordance with the present disclosure.

Referring now to the drawings, wherein the depictions are for the purpose of illustrating certain exemplary embodiments only and not for the purpose of limiting the same, FIG.

1 shows a schematic diagram of the vehicle 10 system which has been constructed in accordance with embodiments of the disclosure.

The exemplary vehicle comprises a passenger vehicle intended for use on highways, although it is understood that the disclosure described herein is applicable on any vehicle or other system seeking to monitor position and trajectory of remote vehicles and other objects. The vehicle includes a control system containing various algorithms and calibrations which it is operable to execute at various times. The control system is preferably a subset of an overall vehicle control architecture which is operable to provide coordinated vehicle system control. The control system is operable to monitor inputs from various sensors, synthesize pertinent information and inputs, and execute algorithms to control various actuators to achieve control targets, including such parameters as collision avoidance and adaptive cruise control. The vehicle control architecture comprises a plurality of distributed processors and devices, including a system controller providing functionality such as antilock brakes, traction control, and vehicle stability.

Each processor is preferably a general-purpose digital computer generally comprising a microprocessor or central processing unit, read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. Each processor has a set of control algorithms, comprising resident program instructions and calibrations stored in ROM and executed to provide respective functions.

Algorithms described herein are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of a respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

Figure 2:
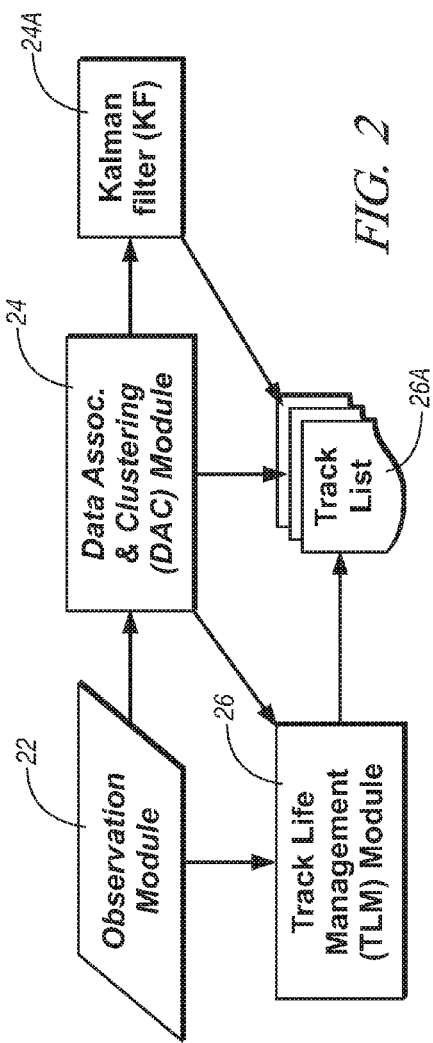
FIGS. 2 and 3 are schematic diagrams of a control system, in accordance with a first embodiment of the disclosure.
Figure 3:
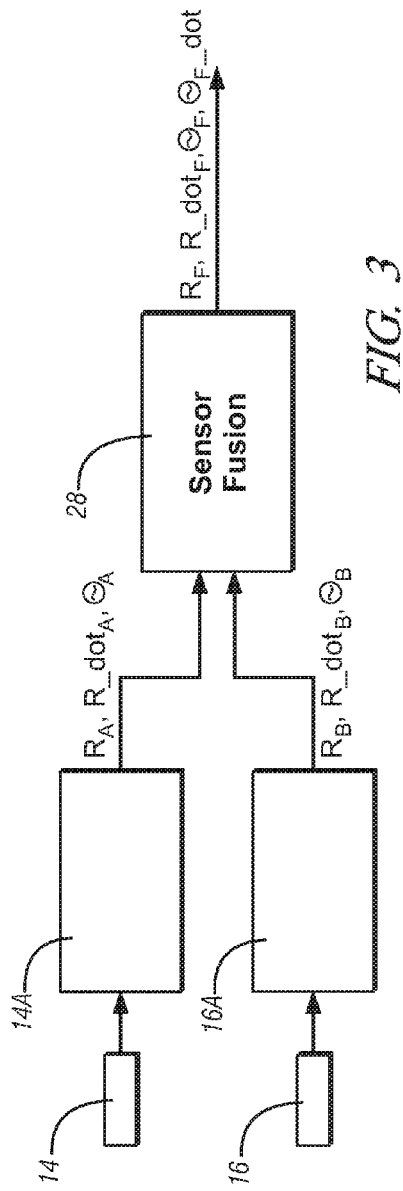

Referring now to FIGS. 2 and 3, the exemplary vehicle 10 generally includes a control system having an observation module 22, a data association and clustering (DAC) module 24 that further includes a Kalman filter 24A, and a track life management (TLM) module 26 that keeps track of a track list 26A comprising of a plurality of object tracks. More particularly, the observation module includes sensors 14 and 16, their respective sensor processors, and the interconnection between the sensors, sensor processors, and the DAC module.

The exemplary sensing system preferably includes object-locating sensors comprising at least two forward-looking range sensing devices 14 and 16 and accompanying subsystems or processors 14A and 16A. The object-locating sensors may include a short-range radar subsystem, a long-range radar subsystem, and a forward vision subsystem. The object-locating sensing devices may include any range sensors, such as FM-CW radars, (Frequency Modulated Continuous Wave), pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other known camera/video image processors which utilize digital photographic methods to 'view' forward objects. Such sensing systems are employed for detecting and locating objects in automotive applications, useable with systems including, e.g., adaptive cruise control, collision avoidance, pre-crash safety, and side-object detection. The exemplary vehicle system may also include a global position sensing (GPS) system.

These sensors are preferably positioned within the vehicle 10 in relatively unobstructed positions relative to a view in front of the vehicle. It is also appreciated that each of these sensors provides an estimate of actual location or condition of a targeted object, wherein said estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but is not normally robust in estimating the extent of a detected object. A camera with vision processor is more robust in estimating a shape and azimuth position of the object, but is less efficient at estimating the range and range rate of the object. Scanning type Lidars perform efficiently and accurately with respect to estimating range, and azimuth position, but typically cannot estimate range rate, and is therefore not accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, conventional sensors present parametric variances, but more importantly, the operative overlap of these sensors creates opportunities for sensory fusion.

Each object-locating sensor and subsystem provides an output including range, R, time-based change in range, R_dot, and angle, $\Theta$, preferably with respect to a longitudinal axis of the vehicle, which can be written as a measurement vector (o), i.e., sensor data. An exemplary short-range radar subsystem has a field-of-view (FOV) of 160 degrees and a maximum range of thirty meters. An exemplary long-range radar subsystem has a field-of-view of 17 degrees and a maximum range of 220 meters. An exemplary forward vision subsystem has a field-of-view of 45 degrees and a maximum range of fifty (50) meters. For each subsystem the field-of-view is preferably oriented around the longitudinal axis of the vehicle 10. The vehicle is preferably oriented to a coordinate system, referred to as an XY-coordinate system 20, wherein the longitudinal axis of the vehicle 10 establishes the X-axis, with a locus at a point convenient to the vehicle and to signal processing, and the Y-axis is established by an axis orthogonal to the longitudinal axis of the vehicle 10 and in a horizontal plane, which is thus parallel to ground surface.

As shown in FIG. 3, the illustrated observation module 22 includes first sensor 14 located and oriented at a discrete point A on the vehicle, first signal processor 14A, second sensor 16 located and oriented at a discrete point B on the vehicle, and second signal processor 16A. The first processor 14A converts signals (denoted as measurement $o_A$) received from the first sensor 14 to determine range (RA), a time-rate of change of range (R_dotA), and azimuth angle ($\Theta A$) estimated for each measurement in time of target object 30. Similarly, the second processor 16A converts signals (denoted as measurement $o_B$) received from the second sensor 16 to determine a second set of range (RB), range rate (R_dotB), and azimuth angle (ΘB) estimates for the object 30.

The preferred DAC module 24 includes a controller 28, wherein an algorithm and associated calibration (not shown) is stored and configured to receive the estimate data from each of the sensors A, B, to cluster data into like observation tracks (i.e. time-coincident observations of the object 30 by sensors 14 and 16 over a series of discrete time events), and to fuse the clustered observations to determine a true track status. It is understood that fusing data using different sensing systems and technologies yields robust results. Again, it is appreciated that any number of sensors can be used in this technique. However, it is also appreciated that an increased number of sensors results in increased algorithm complexity, and the requirement of more computing power to produce results within the same time frame. The preferred controller 28 is housed within the host vehicle 10, but may also be located at a remote location. In this regard, the preferred controller 28 is electrically coupled to the sensor processors 14A, 16A, but may also be wirelessly coupled through RF, LAN, infrared or other conventional wireless technology. The TLM module 26 is configured to receive and store fused observations in a list of tracks 26A.

Sensor registration, or "alignment" of sensors, in multi-target tracking ('MTT') fusion, involves determining the location, orientation and system bias of sensors along with target state variables. In a general MTT system with sensor registration, a target track is generated during vehicle operation. A track represents a physical object and comprises a number of system state variables, including, e.g., position and velocity. Measurements from each individual sensor are usually associated with a certain target track.

One assumption, within a general MTT system, includes assuming all sensor registration parameters (e.g., orientation data and system bias of the sensors) are collected in the parameter vector a(t), which can vary with time. To accommodate the sensor registration problem in a general MTT system context, it is convenient to stack track joint state x(t) and registration parameter a(t) together as [x(t), a(t)] at a time t. The system dynamics equation for the target track state and sensor registration parameters can be expressed as:

$$x(t+1)=f_x(x(t),w_x(t)) \quad (1)$$

and $$a(t+1)=f_a(a(t),w_a(t)) \quad (2)$$

respectively, where functions f relate the state at time t to the state at time t+1; and where terms w are vectors of noise parameters with zero-mean and having nonsingular covariance matrices.

To accommodate sensors that measure a subset of signals including range, azimuth, and range rate for all targets in their field of view, the following measurement model with registration augmentation is adopted:

$$o(t)=h_t(x(t),a(t))+n(t) \quad (3)$$

where $h_t(.)$ is the measurement function mapping the joint track state x(t) to the corresponding sensor measurements o(t) at time t; and n(t) is a vector of measurement zero-mean noise parameters that are assumed to have a covariance matrix R, which can be found in the performance specification of the sensor.

To facilitate late derivation, an information array to present a Gaussian distribution is used. A random vector x with Gaussian distribution $N(\bar{x}, Q)$ can be denoted as an information array such as $[R, \bar{z}]$, where $\bar{z}=R\bar{x}$ and $Q=R^{-1}R^{-T}$. If Gaussian density is assumed, the approach to solve a joint posterior density function is to consider it as part of the recursive least squares performance minimization and find a joint state s(t)=[x(t), a(t)] through:

$$J_t = e(t-1) + \|\tilde{R}_t s(t) - \tilde{z}_t\|^2 + \|h(s(t)) - o(t)\|^2 + \|R_w(t) - z_w(t)\|^2 \quad (4)$$

subject to the system dynamics constraint Eqs. (1) and (2), where e(t) denotes a sum of estimation error up to and including a time t; where the information array $[\tilde{R}_t, \tilde{z}_t]$ denotes the a priori of s, containing the historical sensor registration and track data from initial time to the previous time t−1; and where the process noise vector in Eqs. (1) and (2) is denoted as $[R_w(t), z_w(t)]$.

A filtering and prediction problem is formalized in Eq. (4), i.e., measurements to the current time are used to estimate the current joint state of targets. Estimating the current joint state of target involves a solution of the fixed interval smoothing problem, i.e., the use of past and current data to estimate the past history of the system. One method estimates the current system state s(t) and past system states s(t−1), s(t−2), ..., s(t−T+1) by minimizing $$J_t = e(t-T) + \|\tilde{R}_{t-T+1} s - \tilde{z}_{t-T+1}\|^2 + \sum_{j=t-T+1}^{t}(\|h(x(j), a(j)) - o(j)\|^2 + \|R_w(j) - z_w(j)\|^2) \quad (5)$$

subject to the system dynamics constraint Eqs. (1) and (2); and where T is the fixed interval and $[R_{t-T+1}, z_{t-T+1}]$ is the information array of a priori at time t−T, containing the historical sensor registration and track data before time t−T+1.

If the system dynamics states are treated as independent quantities along the time axis, then the system dynamics constraints (i.e., Eqs. (1) and (2)) of above equation are not considered. The above least-squares equation can be simplified to:

$$J_t = \|\tilde{R}_a a - \tilde{z}_a\|^2 + \sum_{j=t-T+1}^{t} \|h(x(j), a(j)) - o(j)\|^2 \quad (6)$$

where the first term, the prior information array $[\tilde{R}_a, \tilde{z}_a]$ which can be predetermined during the initial settings and calibration. Equation (6) is the theoretical basis for a first embodiment, which will be described in detail below. Eq. (6) enables sensor registration parameters a to be computed through minimizing the discrepancy between the target track x and sensor measurement o.

A first embodiment comprises a method to determine an alignment of each object-locating sensor relative to the XY-coordinate system 20 for the vehicle, executed as one or more algorithms in the aforementioned control system. The method comprises establishing initial values for the alignments of each of the object-locating sensors relative to the XY-coordinate system for the vehicle, for each sensor. A plurality of positions for a target object 30 is determined, as measured by each of the object-locating sensors, and trajectories are thus determined. A fused trajectory for the target object is determined, based upon the aforementioned trajectories. Alignment of each of the object-locating sensors is adjusted relative to the XY-coordinate system for the vehicle based upon the fused trajectory for the target object as described further herein below.

The schematic illustration of FIG. 1 includes the aforementioned object-locating sensors 14 and 16 mounted on the exemplary vehicle at positions A and B, preferably mounted at the front of the vehicle 10. The target object 30 moves away from the vehicle, wherein t1, t2, and t3 denote three consecutive time frames. Lines ra1-ra2-ra3, rf1-rf2-rf3, and rb1-rb2-rb3 represent, respectively, the locations of the target measured by first sensor 14, fusion processor, and second sensor 16 at times t1, t2, and t3, measured in terms of $o_A=(R_A, R\_dot_A, \Theta_A)$ and $o_B=(R_B, R\_dot_B, \Theta_B)$, using sensors 14 and 16, located at points A, B.

A known exemplary trajectory fusing process, for example as disclosed in co-pending U.S. patent application Ser. No. 11/235,679, entitled SYSTEM AND METHOD OF TARGET TRACKING USING SENSOR FUSION, and incorporated herein by reference, permits determining position of a device in the XY-coordinate system relative to the vehicle. The fusion process comprises measuring the target object 30 in terms of $o_A=(R_A, R\_dot_A, \Theta_A)$ and $o_B=(R_B, R\_dot_B, \Theta_B)$, using sensors 14 and 16, located at points A, B. A fused location for the target object 30 is determined, represented as $x=(RF, R\_dotF, \Theta F, \Theta\_dotf)$, described in terms of range, R, and angle, $\Theta$, as previously described. The position of forward object 30 is then converted to parametric coordinates relative to the vehicle's XY-coordinate system. The control system preferably uses fused track trajectories (Line rf1, rf2, rf3), comprising a plurality of fused objects, as a benchmark, i.e., ground truth, to estimate true sensor positions for sensors 14 and 16. As shown in FIG. 1, the fused track's trajectory is given by the target object 30 at time series t1, t2, and t3. Using a large number of associated object correspondences, such as {(ra1, rf1, rb1), (ra2, rf2, rb2), (ra3, rf3, rb3)} true positions of sensors 14 and 16 at points A and B, respectively, can be computed to minimize residues, preferably employing a known least-squares calculation method. In FIG. 1, the items designated as ra1, ra2, and ra3 denote an object map measured by the first sensor 14. The items designated as rb1, rb2, and rb3 denote an object map observed by the second sensor 16.

With reference now to FIG. 2, the fused track is preferably calculated and determined in the sensor fusion block 28 of FIG. 3. The process of sensor registration comprises determining relative locations of the sensors 14 and 16 and the relationship between their coordinate systems and the frame of the vehicle, identified by the XY-coordinate system. Registration for single object sensor 16 is now described. All object sensors are preferably handled similarly. For object map compensation, the sensor coordinate system or frame, i.e. the UV-coordinate system, and the vehicle coordinate frame, i.e. the XY-coordinate system, are preferably used. The sensor coordinate system (u, v) is preferably defined by: (1) an origin at the center of the sensor; (2) the v-axis is along longitudinal direction (bore-sight); and (3) a u-axis is normal to v-axis and points to the right. The vehicle coordinate system, as previously described, is denoted as (x, y) wherein x-axis denotes a vehicle longitudinal axis and Y-axis denotes the vehicle lateral axis.

The locations of track (x) can be expressed in XY-coordinate system as (r). Sensor measurement (o) can be expressed in UV-coordinate as (q). The sensor registration parameters (a) comprise of rotation (R) and translation (r0) of the UV-coordinate system. Given the definitions of (r), (q), (R), and (r0), Eq. (3) can be simplified to: $q=h(r,R,r_0)$ described in further detail herein below.

To transform a point comprising a time-stamped location of the target object 30 located on the sensor coordinate system (u, v) to the vehicle coordinate system (x, y), Eq. (7) is used:

$$r = Rq + r_0 \quad (7)$$

wherein the track is: $r=(x, y)$, the matched sensor measurement is: $q=(u, v)$, R is a 2-D rotation, and $r_0=(x_0, y_0)$ is the position of the sensor center in the vehicle frame. Initially R and $r_0$ can be determined by a manual calibration process post production. The a priori uncertainties of registration parameters will be considered in Eq. (6) as the first term to be minimized. During operation, this information is corrected by an incremental rotation $\delta R$ and translation $\delta r_0$ so that the new rotation and translation become as depicted in Eqs. (8) and (9), below:

$$R' = \delta R R \quad (8)$$

$$r'_0 = r_0 + \delta r_0 \quad (9)$$

wherein R is written as:

$$R = \begin{bmatrix} \cos\psi & \sin\psi \\ -\sin\psi & \cos\psi \end{bmatrix}. \quad (10)$$

The value $\psi$ denotes the specific sensor's angular alignment with respect to the vehicle frame, i.e. the orientation of the UV-coordinate system relative to the XY-coordinate system. Since the alignment corrections are typically small, the incremental rotation $\delta R$ can be approximated by:

$$\delta R = I + \varepsilon \quad (11)$$

wherein:

$$\varepsilon = \begin{bmatrix} 0 & \delta\psi \\ -\delta\psi & 0 \end{bmatrix} \quad (12)$$

and $\delta\psi$ denotes correction of the alignment angle.

A correction of the object position is given by Eq. (13):

$$\Delta r = r' - r = R'q + r'_0 - Rq - r_0 \quad (13)$$

Equations 1-6, above, are combined to yield Eq. (14):

$$\Delta r = \delta R R q + \delta r_0 - Rq = \varepsilon(r - r_0) + \delta r_0. \quad (14)$$

Eq. (14) is rewritten in component form, as Eq. (15):

$$\Delta r = \begin{bmatrix} \Delta x \\ \Delta y \end{bmatrix} = A\beta = \begin{bmatrix} 1 & 0 & -(y - y_0) \\ 0 & 1 & x - x_0 \end{bmatrix} \begin{bmatrix} \delta x_0 \\ \delta y_0 \\ \delta\psi \end{bmatrix} \quad (15)$$

wherein:

$$\delta r_0 = (\delta x_0, \delta y_0)^T \quad (16)$$

$$r_i = (x_i, y_i)^T \quad (17)$$

$$r_0 = (x_0, y_0)^T \quad (18)$$

$$\beta = (\delta x_0, \delta y_0, \delta\psi)^T \quad (19)$$

Correction of the sensor position is determined by using matched track-measurement pairs only, through minimization of Eq. (13). Results calculated in Eq. (15) provide a model by which unknown corrections $\beta$ are estimated by minimizing a respective $\chi^2$ function (a simplified version of Eq. (13)) using a large number of matched objects.

For example, assuming the matched object is denoted by {(rfi, rai)|i=1, . . . , N}, wherein rfi denotes the location of the i-th track, and rai denotes the measurement of the sensor A associated to i-th track. The $\chi^2$ function is minimized to:

$$\chi^2 = \sum_{i=1}^{N} (\Delta r_i - A_i \beta)^T W (\Delta r_i - A_i \beta) \quad (20)$$

wherein the sum is taken over all matched object pairs (rfi, rai), $\Delta ri=rfi-rai$ and $W=\text{diag}\{w_1, w_2, \ldots, w_N\}$ is a weight matrix. Here $w_i$ is a function of object range (i.e., $w_i = f(r_i)$) such that distant matched objects are attributed larger weighting factors than nearby matched objects. The correction $\beta$ is found by the least square estimation procedure. The solution is shown in Eq. (21), below:

$$\beta = \left( \sum_{i=1}^{N} A_i^T W^{-1} A_i \right)^{\dagger} \left( \sum_{i=1}^{N} A_i^T W^{-1} \Delta r_i \right) \quad (21)$$

wherein $(.)^{\dagger}$ denotes a pseudoinverse of $(.)$. Therefore, the incremental correction equations of the sensor position (R and $r_0$) comprise Eq. (22) and (23), below:

$$R' = R + \varepsilon R = R + \eta \begin{bmatrix} 0 & \delta \psi \\ -\delta \psi & 0 \end{bmatrix} R \quad (22)$$

$$r'_0 = r_0 + \eta \begin{bmatrix} \delta x_0 \\ \delta y_0 \end{bmatrix} \quad (23)$$

wherein $\eta$ is a learning factor, typically a small positive number (e.g., $\eta=0.01$) for updating the sensor position iteratively through time. A large value for $\eta$ may help the algorithm converge to a true value, but may lead to undesirable offshoot effects. Alternatively, the drift of sensor position is typically a slow process, thus permitting a small parametric value for $\eta$.

In sum, this embodiment implements Eq. (6) with prior information term $[\tilde{R}_a, \tilde{z}_a]$ set to sensor calibration parameters to manufacture nominal values, and minimizing the discrepancy between the track and measurement pairs $\{(rfi, rai)|i=1, \ldots, N\}$. In other words, adjusting alignment of each object-locating sensor relative to the vehicle coordinate system comprises initially setting each sensor's position (R and $r_0$) to nominal values. The following steps are repeated: compensating each object map based upon on each sensor's position (R and $r_0$); fusing outputs from each of the sensors to determine a series of temporal benchmark positions for the targeted object; and storing a trajectory and associated object map in a circular queue for the fused outputs. When the queues of fused objects have a predetermined amount of data execute the following actions for each sensor: outputting the matched object $\{(rfi, rai)|i=1, \ldots, N\}$ in the queues, wherein rfi and rai denote the positions of the track and its associated sensor measurement, respectively; executing Eq. (21) to compute corrections $\beta$; and executing Eqs. (22) and (23) to update each sensor's position (R and $r_0$).

A second embodiment comprises a method to determine an alignment of each object-locating sensor relative to the XY-coordinate system 20 for the vehicle while simultaneously tracking an object, executed as one or more algorithms in the aforementioned control system. The method comprises estimating the joint posterior density of target track and sensor registration, given measurements from the first time step up to a present time. When MTT algorithms assume that the joint posterior density function can be factorized over the individual targets, a computationally feasible embodiment of single target tracking strategies, such as the Kalman filter 24A, to the multi-target tracking scenario is facilitated. The computational cost to perform MTT scales linearly with the number of targets, which is important for scenarios with larger numbers of targets.

However, the joint posterior density function cannot be factorized directly. This means the single target tracking strategies cannot be applied and, thus, estimation is done in the full joint posterior density state space. The treatment of the full joint posterior density scales cubically with the number of targets, and can be computationally intensive. Below, we will disclose a fast estimation method if all the involved posterior densities are Gaussian.

Referring now to FIG. 6, wherein the showings are for the purpose of illustrating the embodiment. The method is initiated upon reception of sensor data. A data association module will match the sensor data with the predicted location of a target. The joint tracking and registration module combines the previous estimation (i.e., a priori) and new data (i.e., matched measurement-track pairs), and updates the target tracks estimation and sensor registration data in the database. The time propagation process module predicts the target tracks or sensor registration parameters in the next time cycle based on the historical sensor registration, tracks and current vehicle kinematics via a dynamics model. The sensor registration parameters are usually assumed to be substantially constant over time. Confidence of the registration parameters accumulates over time. However, a priori information about registration will be reset to zero when a significant sensor registration change is detected (e.g., vehicle collision).

It is convenient to stack track state and registration parameters into one large state vector includes n tracks and registration parameters from k sensors as below:

$$s = [x_1^T x_2^T \ldots x_n^T a_1^T \ldots a_k^T]^T \quad (24)$$

where the i-th target track $x_i$ (i=1, \ldots n) comprises a set of parameters, e.g., position, velocity, and acceleration, and the registration parameters for j-th sensor $a_j$ (j=1, \ldots, k) for each sensor comprises of location error, an azimuth alignment error, and range offset.

The measurement process for the j-th sensor can be modeled symbolically as a function of a target track ($x_i$), and registration parameter ($a_j$), such as:

$$o_{a_i}^{(j)} = h(x_i, a_j) + v \quad (25)$$

where $o_{a_i}^{(j)}$ denotes the measurements associated with the target track $x_i$ from the j-th sensor; $a_i$ is measurement association variable for the i-th target track; and v denotes the additive noise term of the measurement process, which can be determined during calibration.

Linearizing Eq. (25) using Taylor expansion at the neighborhood [x*,a*] produces:

$$o = C_x x + C_a a + u + v \quad (26)$$

with $u = h^* - C_x x^* - C_a a^*$, $h^* = h(x^*, a^*)$, and Jacobian matrices $C_x$ and $C_a$. Without losing the generality, the covariance matrix of v is assumed to be an identity matrix. If not, the noise term v in Eq. (26) can be expanded to a random vector with identity covariance matrix. Let $\text{cov}\{v\} = R_v$ denote the covariance matrix of the measurement model, or sensor data's covariance matrix can be derived from sensor's specification. Multiplying both sides of Eq. (26) by $L_v$, the square root information matrix of $R_v$, results in a measurement equation with an identity covariance matrix.

In FIG. 6, the joint tracking and registration module integrates a priori information and measurement matrix derived from the associated track-measurement pairs by minimizing the least squares performance functional in Eq. (4).

The a priori information array $[\tilde{R},\tilde{z}]$ (time subscript omitted) used in second term of Eq. (4) can be expanded to:

$$\begin{bmatrix} \tilde{R}_x & \tilde{R}_{xa} & \tilde{z}_x \\ & \tilde{R}_a & \tilde{z}_a \end{bmatrix} \quad (27)$$

Inserting Eqs. (26) and (27) into Eq. (4) and omitting time t, produces:

$$J_t = e(t-1) + \left\| \begin{bmatrix} \tilde{z}_x \\ \tilde{z}_a \end{bmatrix} - \begin{bmatrix} \tilde{R}_x & \tilde{R}_{xa} \\ & \tilde{R}_a \end{bmatrix} \begin{bmatrix} x \\ a \end{bmatrix} \right\|^2 + \quad (28)$$

$$\|C_x x + C_a a + u - o\|^2 + \|z_w - R_w w\|^2$$

Eq. (28) can be reorganized as:

$$J_t = e(t-1) + \left\| \begin{bmatrix} \tilde{R}_x & \tilde{R}_{xa} \\ 0 & \tilde{R}_a \\ C_x & C_a \end{bmatrix} \begin{bmatrix} x \\ a \end{bmatrix} - \begin{bmatrix} \tilde{z}_x \\ \tilde{z}_a \\ u-o \end{bmatrix} \right\|^2 + \|z_w - R_w w\|^2 \quad (29)$$

The second term in Eq. (29) can be written as a matrix X expressed in Eq. (30). X can be turned into a triangular matrix by applying factorization operator, orthogonal transformation, T:

$$\hat{T}X = \hat{T} \begin{bmatrix} \tilde{R}_x & \tilde{R}_{xa} & \tilde{z}_x \\ 0 & \tilde{R}_a & \tilde{z}_a \\ C_x & C_a & u-o \end{bmatrix} = \begin{bmatrix} \hat{R}_x & \hat{R}_{xa} & \hat{z}_x \\ 0 & \hat{R}_a & \hat{z}_a \\ 0 & 0 & e_1 \end{bmatrix} \quad (30)$$

where $e_1$ is the residual corresponding to the first term of the right side of Eq. (29), reflecting the discrepancy between the model and measurement. Substituting Eq. (30) into Eq. (29), and using the orthogonal property of produces:

$$J_t = e(t-1) + e_1 + \left\| \begin{bmatrix} \hat{z}_x \\ \hat{z}_a \end{bmatrix} - \begin{bmatrix} \hat{R}_x & \hat{R}_{xa} \\ & \hat{R}_a \end{bmatrix} \begin{bmatrix} x \\ a \end{bmatrix} \right\|^2 + \|z_w - R_w w\|^2 \quad (31)$$

with sum of squares $e_1 = \|e_1\|^2$. Therefore, an updated posterior density is expressed in the information array form as:

$$\begin{bmatrix} \hat{R}_x & \hat{R}_{xa} & \hat{z}_x \\ & \hat{R}_a & \hat{z}_a \end{bmatrix} \quad (32)$$

The significance of joint tracking and registration can be shown by investigating Eq. (31). Swapping the order, the joint state vector to be $[a^T, x^T]^T$ and applying an orthogonal transformation, the third term of Eq. (31) can be expressed as:

$$\left\| \begin{bmatrix} \hat{z}_a \\ \hat{z}_x \end{bmatrix} - \begin{bmatrix} \hat{R}_a & \hat{R}_{ax} \\ & \hat{R}_x \end{bmatrix} \begin{bmatrix} x \\ a \end{bmatrix} \right\|^2 \quad (33)$$

The quantity in Eq. (33) converges to zero if a and x satisfy the following equation:

$$a = \hat{R}_a^{-1}\hat{z}_a - \hat{R}_a^{-1}\hat{R}_{ax} x \quad (34)$$

Let $a^{(0)} = \hat{R}_a^{-1}\hat{z}_a$ and $S = -\hat{R}_a^{-1}\hat{R}_{ax}$, Eq. (34) can be expressed as:

$$a = a^{(0)} + \sum_{i=1}^{N} \hat{S}_i x_i \quad (35)$$

where $S_i$ denotes the i-th row of a sensitivity matrix S and $x_i$ denotes the i-th track. The significance of representation Eq. (35) is that $a^{(0)}$, i.e., a standalone estimate, is an estimate that would result if the target track x is treated as a deterministic quantity, which can be estimated by a separate process. An additional correction term is shown in Eq. (35). The correction term plays an important role in joint tracking and registration. The correction term automatically provides a solution to tune the weight vector W in Eq. (20) of the first embodiment. The correction term can also intelligently give more weight to those target tracks with less estimation uncertainty and with far distance offset from the host vehicle. In contrast, prior tracking and registration methods assumed tracking and registration estimation are two separate processes. When tracking and registration are separate, set the correlation term $\hat{R}_{ax}$ in Eq. (33) to zero. Therefore, the sensitivity matrix converges to zero, and the joint correction Eq. (35) is neglected.

In addition to the joint tracking and registration module in FIG. 6, a time propagation process module using matrix factorization on the third term in Eq. (31) can be utilized. MTT algorithms can assume state distribution function factorizes over the individual targets. Assuming each individual target has its own system dynamics equation, the system dynamics equation (Eqs. (1) and (2)) for the state vector $x_i$ of i-th target can be expressed as:

$$x_i(t+1) = f_i(x_i(t), w_i(t)) \quad (36)$$

The linear approximation of Eq. (36) in the neighbor of $x^*_i$ and $w^*_i$, for the state vector $x_i$ of i-th target can be expressed as:

$$x_i(t+1) = \Phi_i x(t) + G_i w_i(t) + u_i \quad (37)$$

where $\Phi_i$ and $G_i$ are Jocobian matrices; and the nonlinear term $u_i = f_i(x^*_i, w^*_i) - \Phi_i x^*_i - G_i w^*_i$. The noise term $w_i(t)$ can be denoted by the information array $[R_{wi}, z_{wi}]$. The system dynamics equation of joint track state x can be expressed as:

$$x(t+1) = \Phi_x x(t) + G_x w(t) + u \quad (38)$$

where the collective quantities $\Phi_x$, $G_x$, w, and u are their corresponding component quantities, respectively.

The system dynamics equation (Eq. (2)) for the sensor registration vector a behaves differently. Contrasted with the dynamic nature of target tracks, the registration parameters vary slowly over time. a is assumed to remain the same until environmental conditions of the sensors substantially change (e.g., vehicle collision). Thus Eq. (2) can be simplified as:

$$a(t+1) = a(t) + w_a(t) \quad (39)$$

where $$w_a(t) = \begin{cases} 1/\varepsilon & \text{siginicant change is detected} \\ 0 & \text{otherwise.} \end{cases} \quad (40)$$

Figure 9:
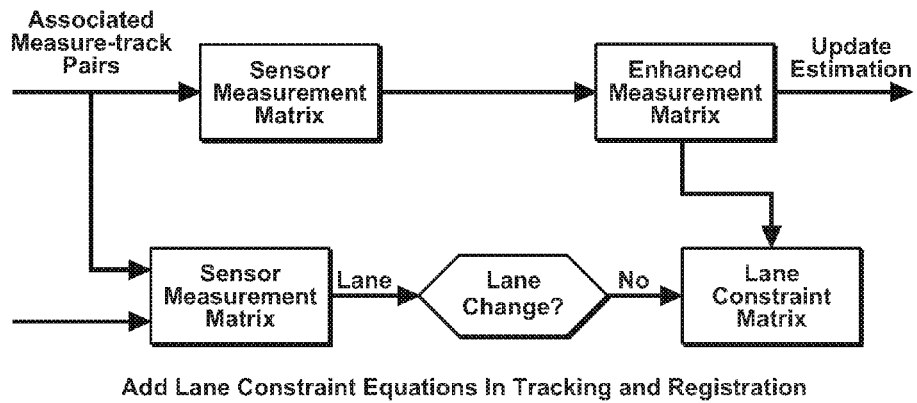

FIG. 9 depicts a gating logic which illustrates the process used to determine whether the sensor registration has significantly changed. Several heuristic rules can be used to determine the gating logic. For example, if the host vehicle follows a target in the same lane, the lateral offset of the target measured by the sensor can be sufficiently small (e.g., less than a threshold). When an alignment-change is detected, the a priori information about the alignment data from the last epoch needs to be reset to a non-information priori. Providing a priori from the last epoch. [$z_a$(t−1) $R_a$(t−1)], set:

$$z_a(t-1)=0 \; R_a(t-1)=\varepsilon I \quad (41)$$

with $\varepsilon$ denoting a sufficient small floating number.

Eq. (31) can now be rewritten with time variable t and expressed in matrix form:

$$J_t = e(t-1) + e_1 + \left\| \begin{bmatrix} R_w(t) & 0 & 0 \\ 0 & \hat{R}_x(t) & \hat{R}_{xa}(t) \\ 0 & 0 & \hat{R}_a(t) \end{bmatrix} \begin{bmatrix} w(t) \\ x(t) \\ a(t) \end{bmatrix} - \begin{bmatrix} z_w(t) \\ \hat{z}_x(t) \\ \hat{z}_a(t) \end{bmatrix} \right\|^2 \quad (42)$$

In order to derive the update a priori information array and include measurement data, $J_t$ can be expressed in terms of x(t+1) and a(t+1). To express $J_t$ in terms of x(t+1) and a(t+1), and joint system state at time t+1, eliminate x(t) and a(t) from Eq. (42) such as:

$$J_t = e(t-1) + e_1 + \quad (43)$$
$$\left\| \begin{bmatrix} R_w(t) & 0 & 0 \\ -\hat{R}_x\Phi_x^{-1}G_x & \hat{R}_x\Phi_x^{-1} & \hat{R}_{xa}(t) \\ 0 & 0 & \hat{R}_a(t) \end{bmatrix} \begin{bmatrix} w(t) \\ x(t) \\ a(t) \end{bmatrix} - \begin{bmatrix} z_w(t) \\ \hat{z}_x(t) + \hat{R}_x\Phi_x^{-1}u \\ \hat{z}_a(t) \end{bmatrix} \right\|^2$$

In analogous manner as Eq. (30), the third term in Eq. (43) can be denoted as matrix Y. After apply an orthogonal transformation $\tilde{T}$ to turn the matrix Y into a triangular matrix such as:

$$\tilde{T}Y = \begin{bmatrix} \tilde{R}_w(t+1) & \tilde{R}_{wx}(t+1) & \tilde{R}_{wa}(t+1) & \tilde{z}_w(t+1) \\ 0 & \tilde{R}_x(t+1) & \tilde{R}_{xa}(t+1) & \tilde{z}_x(t+1) \\ 0 & 0 & \tilde{R}_a(t+1) & \tilde{z}_a(t+1) \end{bmatrix} \quad (44)$$

By substituting Eq. (44) back into Eq. (43), and using the property of orthogonal matrix, Eq. (45) is obtained $$J_t = e(t) + \left\| \begin{bmatrix} \tilde{z}_x(t+1) \\ \tilde{z}_a(t+1) \end{bmatrix} - \begin{bmatrix} \tilde{R}_x(t+1) & \tilde{R}_{xa}(t+1) \\ 0 & \tilde{R}_a(t+1) \end{bmatrix} \begin{bmatrix} x(t+1) \\ a(t+1) \end{bmatrix} \right\|^2 \quad (45)$$

where e(t) denotes sum of the error terms from the time 0 up to and including time t. Eq. (45) does not need to use the past data to compute current estimations of target track state and registration parameters. Comparing Eq. (45) with Eq. (28), the updated prior information array [$\tilde{R}$(t+1),$\tilde{z}$(t+1] at time t+1 can be derived from the second term of Eq. (45) as:

$$\tilde{R}(t+1) = \begin{bmatrix} \tilde{R}_x(t+1) & \tilde{R}_{xa}(t+1) \\ 0 & \tilde{R}_a(t+1) \end{bmatrix} \quad (46)$$

and $$\tilde{z}(t+1) = \begin{bmatrix} \tilde{z}_x(t+1) \\ \tilde{z}_a(t+1) \end{bmatrix}$$

The derivation leading to Eq. (45) illuminates the purposes for using information arrays [$\tilde{R}$(t),$\tilde{z}$(t)], which contain all information from time 0 up to and include time t−1.

Restated, the joint tracking and registration process comprises two factorization operations outlined in Eqs. (30) and (44). Directly applying matrix factorization techniques (e.g., QR decomposition) can be computational intensive as the number of target tracks (n) increases. The computational complexity of QR method scales O(n³) with number of target tracks (n).

Another beneficial aspect of the derivation leading to Eqs. (30) and (45), not shared by other processing methods (e.g., Kalman filter), is that the sparseness structure (i.e., diagonal block matrix) of the matrices $\tilde{R}_x$, $\hat{R}_x$ and $\tilde{R}_x$(t+1) is kept throughout the factorization processes in Eqs. (30) and (32). This provides a basis for deriving the fast joint tracking and registration algorithm discussed below.

Figure 8A:
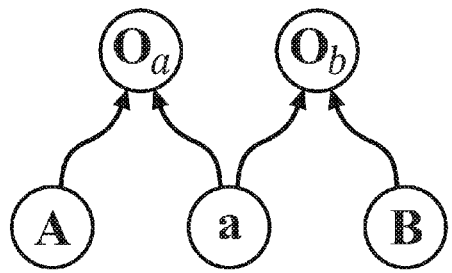

Given the sparseness structure of the matrix on left side of Eq. (30), and measurement matrix (as shown in a dependency diagram of FIG. 8a) the triangular form can be efficiently computed. For most cases, the matrices $\tilde{R}_x$ and $C_x$ in Eq. (30) are in block diagonal form. FIG. 7 illustrates an example schematically with two tracks, two registration parameters, and six measurements. The non-zero elements of the matrix in Eq. (30) are denoted by crosses; and blank position represents a zero element.

Givens rotations are used to eliminate the non-zero low-triangular elements of the matrix in the left side of Eq. (30), shown in FIG. 7 as crosses surrounded by circles. Givens rotations are applied from the left to the right and for each column from the bottom to the top. Each non-zero low-triangular element in the i-th row of the matrix block $C_x$, is combined with an element in the same column in the i-th row of the matrix block $\tilde{R}_x$ to construct the rotation. If both elements involved in Givens rotation are zero, then no rotation is needed. From FIG. 7, it is evident that to turn an element to zero, at most $O(N_x+kN_a)$ rotations are needed, where $N_x$ denotes the number of parameters for each tracked object; k denotes the number of sensors; $N_a$ denotes the number of registration parameters for each sensor. Providing that m measurements are presented, $O(mN_x)$ elements need to be eliminated to zero. Givens rotations are applied a maximum $O(mN_x^2)+mkN_xN_a)$ times to transform the matrix in Eq. (30) into a triangular matrix, which is equivalent to $O(mN_x^2+mkN_xN_a)$ additive and multiplicative operations.

Alternatively, factorization of Eq. (44) can be treated analogously to the factorization of Eq. (30). Recalling the matrix Y, assuming the tracked objects are statistically independent from each other, $\hat{R}_x$ is a block diagonal matrix. Both $\hat{R}_x\Phi_x^{-1}$ and $\hat{R}_x\Phi_x^{-1}G_x$ are block diagonal matrices. FIG. 8 illustrates an example schematically with two tracks and two alignment parameters. The non-zero elements of the matrix Y are denoted by crosses; and blank position represents a zero element. Givens rotations are used to eliminate the non-zero low-triangular elements of the matrix Y, shown in FIG. 8 as crosses annotated by cycle. Givens rotations are applied from the left to the right and for each column from the bottom to the top. Each non-zero low-triangular element in the i-th row of the matrix block $\hat{R}_x \Phi_x^{-1}$ and $\hat{R}_x \Phi_x^{-1} G_x$, are combined with the element in the same column in the i-th row of the matrix block $R_w$ to construct the rotation. If both elements involved in Givens rotation are zero, then no rotation is needed. As FIG. 8 shows, to turn an element to zero, a maximum $O(N_x + kN_a)$ rotations are needed, where $N_x$ denotes the number of parameters for each tracked object. Providing n tracked objects, $O(nN_x^2)$ elements need to be eliminated to zero. Givens rotations are applied a maximum $O(nN_x^3 + nkN_x^2 N_a)$ times to transform the matrix Y into a triangular matrix, which is equivalent to $O(nN_x^3 + nkN_x^2 N_a)$ additive and multiplicative operations.

In sum, the complexity of the Givens rotation method is $O(mN_x^2 + mkN_x N_a + nN_x^3 + nkN_x^2 N_a)$. Where $N_x$ and $N_a$ denote the number of parameters and sensors, respectively, the complexity can then be simplified to:

$$O((m+n)k) \qquad (47)$$

The above complexity derivation (Eq. (47)) shows that the computational complexity of the joint tracking and registration process depicted in FIG. 6 scales linearly with the number of measurements, with the number of sensors, and with the number of target tracks. The computational cost of the proposed measurement update process is comparable to that of a MTT method.

Figure 4:
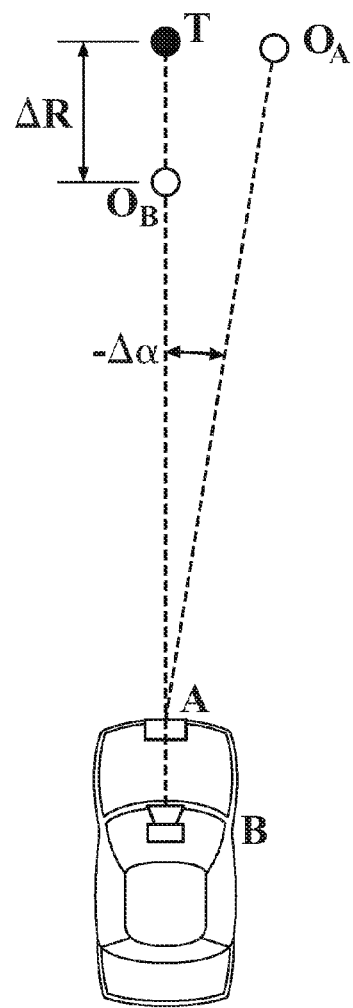

The abovementioned disclosure has regarded joint estimation of target track and registration based on minimizing discrepancies between sensor measurements and predicted target locations in a dynamic system model (e.g., Eq. (4)). However, the solutions of the previously derived method Eqs. (30) and (44) can be not unique or degenerated under certain conditions. This singularity is inherent physics, which cannot be treated only by numerical techniques. For example, as shown in FIG. 4, the orientation of the radar A actually rotates $\Delta\alpha$ from its nominal value reference to the vehicle frame. However, matching sensor data $O_A$ and $O_B$ cannot uniquely determine whether the sensor A has rotated $\Delta\alpha$, or the sensor B has rotated the same angle but in opposite direction while the sensor A is untouched, or any combined rotation of both sensors. This ambiguity can be resolved by including information of vehicle dynamics and lane geometry into the consideration. The basic concept involves assuming that traffic location is usually confined along the center of lanes. For this example, from FIG. 4, the lateral offset of sensor measurement in vehicle frame can determine which sensor is actually misaligned if it is known that both the target and host vehicles are traveling in the same straight lane beforehand.

Providing a priori uncertainties of lane geometry information into the system introduces soft boundary conditions. The lane geometry information can avoid ambiguity when measured sensor parameters vary. By including such information an additional equivalent measurement equation is needed to add in. FIG. 9 illustrates the method to add lane geometry information to the joint tracking and registration process. The lane assignment module determines which lanes the associated measurement-target pairs are located in. If the target vehicle stays in the center of a lane without lane-change maneuver, extra measurement equations can be integrated into the tracking system. For example, in FIG. 10, the target lies on the center of lane, that is:

$$f(x,y)=(x-R)^2+y^2-R^2+v=0 \qquad (48)$$

where quantity v denotes a zero-mean noise random variable. Eq. (48) can be approximated by a linear equation in the neighborhood of the point (x*, y*), as:

$$[2(x^*-R) \quad 2y^*]\begin{bmatrix} x \\ y \end{bmatrix} + v = f^* + 2(x^*-R)x + 2y^*y \qquad (49)$$

which can be appended as a new row into measurement matrices in Eq. (49).

Figure 5:
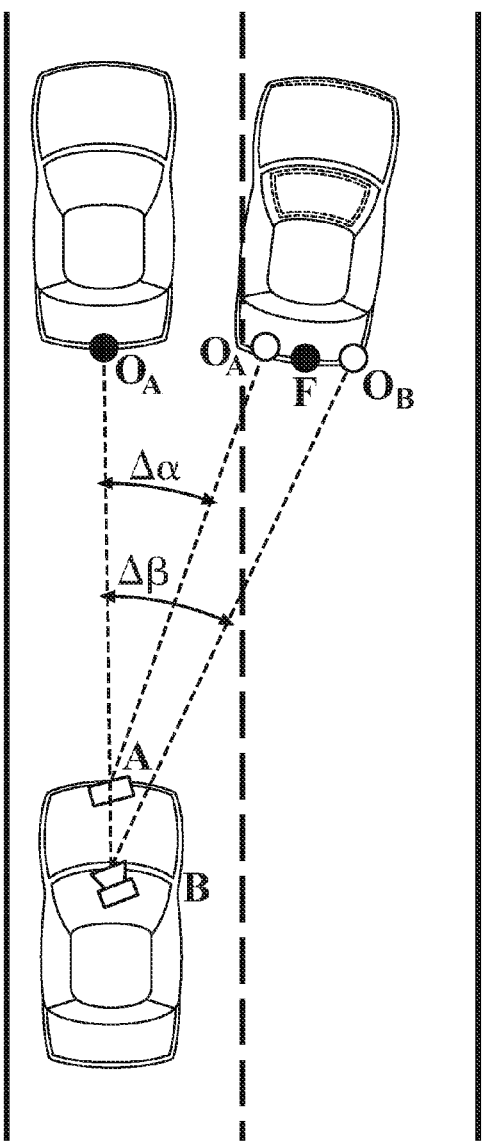

By way of example, with reference to FIG. 5, an example is presented to illustrate some properties of the second embodiment. The schematic illustration of FIG. 5 includes the aforementioned object-locating sensors (i.e., a radar and a camera) mounted on the exemplary vehicle at positions A and B, preferably mounted at the front of the vehicle. A single target, in front and in the same lane as the vehicle, moves away from the vehicle.

Figure 10:
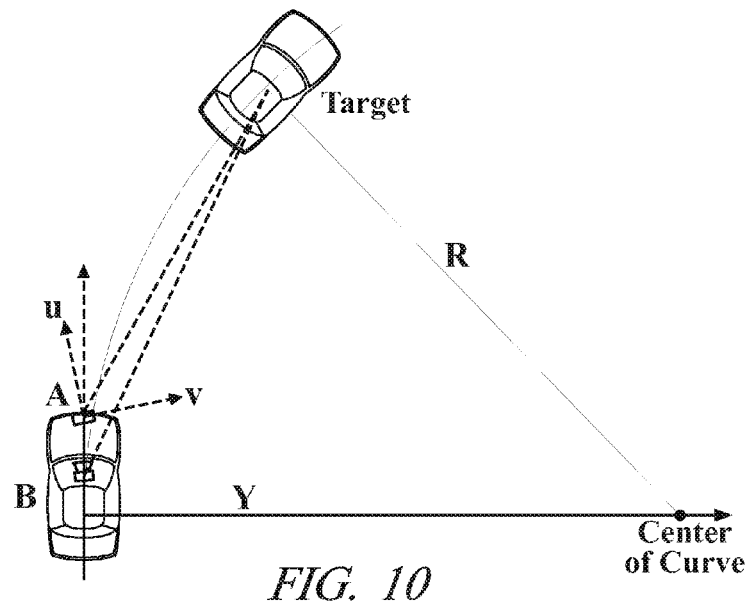

In FIG. 10, the vehicle is preferably oriented to a coordinate system, referred to as an XY-coordinate system, wherein the longitudinal axis of the vehicle establishes the X-axis, with a locus at a point convenient to the vehicle and to signal processing, and the Y-axis is established by an axis orthogonal to the longitudinal axis of the vehicle and in a horizontal plane, which is thus parallel to ground surface. The sensor coordinate system (u, v) is preferably defined as follows: an origin is at the center of the sensor; a v-axis is along longitudinal direction (bore-sight) and u-axis is normal to v-axis and points to the right.

The process of sensor registration comprises determining relative locations of the sensors A and B and the relationship between their coordinate systems and the frame of the vehicle, identified by the XY-coordinate system. Registration for single object sensor A is now described, all object sensors are preferably handled similarly. For object map compensation the sensor coordinate system or frame, i.e. the UV-coordinate system, and the vehicle coordinate frame, i.e. the XY-coordinate system, are preferably used.

In the scenario illustrated in FIG. 10, the positions of the sensors A and B are denoted by $(x_{A0}, y_{A0})$ and $(x_{B0}, y_{B0})$, respectively. The target is located in position $(x\ v_x\ y\ v_y)$ in the XY-coordinate system. If the angles $\psi_A$ and $\psi_B$ of the both sensors need to be estimated, then the state vector is $s=[x\ v_x\ y\ v_y\ \psi_A\ \psi_B]$. Providing each sensor measures range (r), range rate ($\dot{r}$) and azimuth angle ($\theta$), the measurement functions $h=(r_A\ \dot{r}_A\ \theta_A)$ for the sensor A can be expressed as, $$r_A = \sqrt{(x-x_{A0})^2 + (y-y_{A0})^2}, \quad \dot{r}_A = v_r^T n$$

and $$\theta_A = \arctan\left(\frac{y-y_{A0}}{x-x_{A0}}\right) - \psi_A,$$

where $v_r$ and n denote the relative velocity vector and unit vector along the direction from the target to the sensor A. Approximating the measurement functions h in linear form at the point s*, produces:

$$C_{Ax} = \frac{\partial h}{\partial x_A}\bigg|^* \qquad (50)$$

$$= \begin{bmatrix} \frac{x^* - x_{A0}^*}{r^*} & 0 & \frac{y^* - y_{A0}^*}{r^*} & 0 \\ 0 & \frac{x^* - x_{A0}^*}{r^*} & 0 & \frac{y^* - y_{A0}^*}{r^*} \\ -\frac{y^* - y_{A0}^*}{(r^*)^2} & 0 & \frac{x^* - x_{A0}^*}{(r^*)^2} & 0 \end{bmatrix}$$

$$c_{Aa} = \frac{\partial h}{\partial \psi_A}\bigg|^* = \begin{bmatrix} 0 \\ 0 \\ -1 \end{bmatrix} \qquad (51)$$

Similarly, $C_{Bx}$ and $C_{Ba}$ of the sensor B can be derived.

From Eq. (49), the lane constraint equation in FIG. 9 can be written as $$f^* = c_L x \qquad (52)$$

where the lane constraint matrix is defined as $$c_L = [-2(x^* - R) \ 0 \ -2y^* \ 0]. \qquad (53)$$

Let the measurement vector o be denoted as $$o = [r_A \ \dot{r}_A \ \theta_A \ r_B \ \dot{r}_B \ \theta_B \ f^*]^T \qquad (54)$$

The matrix coefficients $C_x$ and $C_a$ of measurement equation in Eq. (26) for the scenario illustrated in FIG. 10 can then be expressed as:

$$C_x = \begin{bmatrix} C_{Ax} \\ C_{Bx} \\ c_L \end{bmatrix} \qquad (55)$$

$$C_a = \begin{bmatrix} c_{Aa} & 0 \\ 0 & c_{Aa} \\ 0 & 0 \end{bmatrix} \qquad (56)$$

Assuming the system dynamic can be modeled as constant velocity (CV) model, then $\Phi_x$, $G_x$, u in Eq. (38) as be written as $$\Phi_x = \begin{bmatrix} 1 & \Delta T & 0 & 0 \\ 0 & 1 & 0 & 0 \\ 0 & 0 & 1 & \Delta T \\ 0 & 0 & 0 & 1 \end{bmatrix} \qquad (57)$$

$$G_x = I \qquad (58)$$

$$u = 0 \qquad (59)$$

And w is expressed by the information array $[R_w, z_w]$, which can be predefined in the system dynamic model.

In summary, simultaneously adjusting alignment of each object-locating sensor and tracking object comprises two repeated factorization operations on matrices X and Y, expressed in Eqs. (30) and (44), respectively. The first factorization can be divided into following steps: plugging the a priori (i.e., previous results and its uncertainty measure) expressed in Eq. (27) and sensor measurements expressed in Eqs. (54), (55), and (56) into matrix X; factorizing X; deriving the posterior density information array as shown in Eq. (32); then calculating an update of tracking and the correction of alignment of the sensors $$\begin{bmatrix} x \\ a \end{bmatrix} = P^{-1} \begin{bmatrix} z_x \\ z_a \end{bmatrix} \qquad (60)$$

where $$P = \begin{bmatrix} \hat{R}_x & \hat{R}_{xa} \\ & \hat{R}_a \end{bmatrix}. \qquad (61)$$

The second factorization operation (Eq. (44)) on matrix comprises the following steps: plugging Eqs. (57), (58) and (59) into Y; factorizing Y; deriving the a priori information array, which can be utilized when the new sensor measurements are available.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for simultaneously tracking a plurality of objects and registering a plurality of object-locating sensors mounted on a vehicle relative to the vehicle, comprising:
   monitoring sensor data from the plurality of object-locating sensors;
   monitoring a plurality of historical target tracks for the plurality of objects;
   monitoring historical sensor registration data;
   simultaneously tracking the plurality of objects and registering the plurality of object-locating sensors based upon the sensor data, the historical sensor registration data, the plurality of historical target tracks, location and orientation of the sensors to the vehicle and a sensor data covariance matrix;
   updating the plurality of historical target tracks for each of the plurality of objects based upon the tracking of the plurality of objects; and
   updating the historical sensor registration data based upon the registering of the plurality of object-locating sensors.

2. The method of claim 1, further comprising:
   determining the plurality of historical target tracks for the plurality of objects though data associations and a time propagations.

3. The method of claim 2, wherein the data associations comprise:
   matching sensor data from the plurality of object-locating sensors with the plurality of historical target tracks.

4. The method of claim 2, wherein the time propagations comprise:
   predicting the tracking of the plurality of objects in a subsequent time cycle based upon the plurality of historical target tracks, a vehicle speed, a vehicle acceleration, and a vehicle yaw rate.

5. The method of claim 2, wherein the time propagations comprise:
   predicting the registering of the plurality of object-locating sensors in a subsequent time cycle based upon the plurality of historical target tracks, a vehicle speed, a vehicle acceleration, and a vehicle yaw rate.

6. The method of claim 1, wherein the historical sensor registration data comprises: a location error, an azimuth registration error, and a range offset.

7. The method of claim 1, further comprising:
aligning the plurality of object-locating sensors relative to a vehicle coordinate system.

8. The method of claim 1, further comprising:
correcting the registering of the plurality of object-locating sensors based upon uncertainty measures and the historical sensor registration data; and
updating the historical sensor registration data and updating the plurality of historical target tracks based upon the corrected registration.

9. The method of claim 1, wherein simultaneously tracking the plurality of objects and registering the plurality of object-locating sensors comprises:

$$a = a^{(0)} + \sum_{i=1}^{N} \hat{S}_i x_i$$

where
a denotes sensor registration parameters,
$S_i$ denotes the i-th row of a sensitivity matrix,
$x_i$ denotes the i-th target track of the sensitivity matrix, and
$a^{(0)}$ is an estimate that would result if the target track x is treated as a deterministic quantity.

10. The method of claim 1, further comprising:
monitoring lane geometry;
determining if the sensor registration data has changed over a threshold based upon lane geometry; and
resetting the historical sensor registration data when the sensor registration data has changed over said threshold.

11. The method of claim 1, further comprising:
generating a recursive error function; and
recursively minimizing the recursive error function.

12. The method of claim 11, wherein the recursive error function comprises:
error accumulated from an initial start time (t0) to and including the previous time frame (t−1);
wherein the recursive error function is based upon:
an uncertainty measure of a previous estimation of target tracks and the sensor registration data, and a priori statistical distribution of target tracks and the sensor registration data;
a magnitude of the discrepancy between monitored sensor data measurements and a measuring model, wherein the measuring model is a function of an unknown target track and an unknown sensor registration data; and
an uncertainty measure of noise parameters in the system dynamics model, wherein the system dynamics model maps the previous estimation of target tracks and the sensor registration data to a current target track and a current sensor registration data.

13. The method of claim 11, wherein the recursive error function is given by:

$$J_t = e(t-1) + \|\tilde{R}_t s(t) - \tilde{z}_t\|^2 + \|h(s(t)) - o(t)\|^2 + \|R_w(t) - z_w(t)\|^2$$

where
e(t−1) denotes a sum of an estimation error up to and including a time t−1,
$[\tilde{R}_t, \tilde{z}_t]$ is an array and denotes an a priori statistical distribution of a joint vector s including target track and the sensor registration data, h denotes a measurement function, and
$[R_w(t), z_w(t)]$ is an array and denotes a statistical distribution of the noise parameters in a system dynamics model.

14. The method of claim 13, wherein the measurement function h comprises:
mapping from an unknown target track to a target position in a sensor coordinate system based on sensor registration.

15. The method of claim 14, wherein the recursive error function comprises:

$$J_t = e(t-T) + \|\tilde{R}_{t-T+1} s - \tilde{z}_{t-T+1}\|^2 + \sum_{j=t-T+1}^{t} (\|h(x(j), a(j)) - o(j)\|^2 + \|R_w(j) - z_w(j)\|^2)$$

where
e(t−T) denotes a sum of estimation error up to and including a time t−T,
$[\tilde{R}_{t-T+1}, \tilde{z}_{t-T+1}]$ is an array and denotes an a priori statistical distribution of [a] joint vector s including target track (x) and the sensor registration data (a) at time t−T+1,
h is a measurement function which maps from an unknown target track to target position in the sensor coordinate system based upon the sensor registration data, and
$[R_w(j), z_w(j)]$ is an array and denotes the noise parameters in the system dynamics model from time t−T+1 to time t.

16. The method of claim 1, further comprising:
monitoring a sensor measurement matrix;
fusing sensor data with a dependency map;
identifying sparseness in covariance matrices including previous estimations of target tracks and sensor registration data and the sensor measurement matrix based on the dependency map;
using Givens rotations to eliminate non-zero triangular elements of the measurement matrix; and
simultaneously tracking the plurality of objects and registering the plurality of object-locating sensors based upon the sensor measurement matrix.

17. The method of claim 16, further comprising:
merging the sensor data and an a priori statistical distribution of a previous estimation of target tracks and sensor registration data via a measurement factorization.

18. The method of claim 17, wherein the measurement factorization comprises:
generating a sparse matrix; and
applying a factorization operator $\hat{T}$ to the matrix.

19. The method of claim 18, wherein the sparse matrix comprises:
an array based upon the a priori statistical distribution; and
wherein the sparse matrix is based upon a measuring model, sensor data and lane geometry including curvature and orientation of the vehicle with respect to the lane geometry.

20. The method of claim 17, further comprising:
using Givens transformations for time propagation factorization; and
generating a sparse matrix.

21. The method of claim 20, wherein the sparse matrix comprises:
a posterior distribution based upon a measurement update;
a coefficient of a system dynamics model after applying a linearization operation; and
the noise parameters of the system dynamics model.

22. The method of claim 21, wherein the sparse matrix is factorized by an orthogonal transformation $\tilde{T}$:

$$\tilde{T}\begin{bmatrix} R_w(t) & 0 & 0 & z_w(t) \\ -\hat{R}_x\Phi_x^{-1}G_x & \hat{R}_x\Phi_x^{-1} & \hat{R}_{xa}(t) & \hat{z}_x(t)+\hat{R}_x\Phi_x^{-1}u \\ 0 & 0 & \hat{R}_a(t) & \hat{z}_a(t) \end{bmatrix} =$$

$$\begin{bmatrix} \tilde{R}_w(t+1) & \tilde{R}_{wx}(t+1) & \tilde{R}_{wa}(t+1) & \tilde{z}_w(t+1) \\ 0 & \tilde{R}_x(t+1) & \tilde{R}_{xa}(t+1) & \tilde{z}_x(t+1) \\ 0 & 0 & \tilde{R}_a(t+1) & \tilde{z}_a(t+1) \end{bmatrix}$$

where $$\begin{bmatrix} \hat{R}_x(t) & \hat{R}_{xa}(t) & \hat{z}_x(t) \\ & \hat{R}_a(t) & \hat{z}_a(t) \end{bmatrix}$$

denotes a posterior distribution based upon the measurement update factorization;

[$R_w(t),z_w(t)$] is an information array and denotes the noise parameters (i.e., statistical distribution) of the system dynamics model; and $\Phi_x$ and $G_x$ denote coefficient matrices of a linearized system dynamics equation.

23. The method of claim 22, wherein the linearized system dynamics equation is given by:

$$x(t+1)=\Phi_x x(t)+G_x w(t)+u$$

where $$u=f(x^*,w^*)-\Phi_x x^*-G_x w^*;$$

x* and w* denote a neighborhood to apply linearization operation, function f is a system dynamics equation, and w denotes a noise term in the system dynamics model.

24. The method of claim 23, further comprising:

applying Givens rotations for each row from the left to the right;

applying Givens rotations for each column from the bottom to the top; and combining each non-zero low-triangular element in an i-th row of a matrix block $C_x$ with an element in a same column in the i-th row of the matrix block $\tilde{R}_x$.

25. The method of claim 24, further comprising:

applying Givens rotations only when both elements involved in the Givens rotations are nonzero.

26. The method of claim 20, wherein the sparse matrix comprises:

an array based upon the a priori distribution wherein the sparse matrix is based upon a measuring model, the sensor data, and lane geometry including curvature and orientation of the vehicle with respect to the lane geometry.

27. The method of claim 26, further comprising:

applying a factorization operator $\hat{T}$ to yield an upper triangular matrix.

28. Method for simultaneously tracking a plurality of objects and registering a plurality of object-locating sensors mounted on a vehicle relative to the vehicle, comprising:

monitoring sensor data from the plurality of object-locating sensors;

monitoring a plurality of historical target tracks for the plurality of objects;

monitoring historical sensor registration data;

monitoring a sensor measurement matrix;

monitoring lane geometry including curvature and orientation of the vehicle with respect to the lane geometry;

simultaneously tracking the plurality of objects and registering the plurality of object-locating sensors based upon the sensor data, the historical sensor registration data, the plurality of historical target tracks, the sensor measurement matrix, the lane geometry, location and orientation of the sensors to the vehicle and sensor data variance;

updating the plurality of historical target tracks for each of the plurality of objects based upon the tracking of the plurality of objects; and updating the historical sensor registration data based upon the registering of the plurality of object-locating sensors.

29. The method of claim 28, further comprising:

generating a sparse matrix.

30. The method of claim 29, wherein the sparse matrix comprises:

an a priori statistical distribution in an information array form; and wherein the sparse matrix is based upon a measuring model and the sensor data; and lane geometry information including curvature and orientation of the vehicle with respect to the lane geometry.

31. The method of claim 28, further comprising:

determining if the sensor registration data changes based upon lane geometry; and resetting the historical sensor registration data when the sensor registration data has changed in excess of a predetermined amount.

32. The method of claim 31, further comprising:

monitoring a target in a common lane with the vehicle;

monitoring a lateral offset of the target with respect to the common lane; and resetting the historical sensor registration data when the lateral offset exceeds a predetermined threshold.

33. The method of claim 31, further comprising:

resetting a priori information regarding the historical sensor registration data from a last epoch to a non-information a priori.

34. The method of claim 33, wherein the a priori information from the last epoch comprises [$z_a(t-1) R_a(t-1)$], wherein resetting a priori information comprises setting $z_a(t-1)=0$ and $R_a(t-1)=\epsilon I$ wherein $\epsilon$ denotes a sufficient small floating number, when the sensor registration data changes a predetermined amount.

* * * * *